United States Patent [19]

Geiger et al.

[11] 4,155,338

[45] May 22, 1979

[54] VALVED APPARATUS FOR DIVERTING AN EXHAUST STREAM

[75] Inventors: Istvan Geiger, Brunswick; Rudolf Krapf, Leimen, both of Fed. Rep. of Germany

[73] Assignee: Volkswagenwerk Aktiengesellschaft, Wolfsburg, Fed. Rep. of Germany

[21] Appl. No.: 888,879

[22] Filed: Mar. 22, 1978

[30] Foreign Application Priority Data

Mar. 23, 1977 [DE] Fed. Rep. of Germany ....... 2712729

[51] Int. Cl.² ............................................. F02M 31/00
[52] U.S. Cl. .......................... 123/122 H; 123/122 AC
[58] Field of Search .... 123/122 AC, 122 A, 122 AA, 123/122 H, 122 R; 261/145, 144

[56] References Cited

U.S. PATENT DOCUMENTS

| 1,169,573 | 1/1916 | Schulz | 123/122 H |
| 4,010,724 | 3/1977 | Schulz | 123/122 AC |

Primary Examiner—Ronald H. Lazarus
Attorney, Agent, or Firm—Brumbaugh, Graves, Donohue & Raymond

[57] ABSTRACT

A device is provided for controlling the flow of exhaust gases of an internal combustion engine in accordance with the operating conditions of the engine. Exhaust gases flowing from the exhaust manifold are routed either directly to the muffler or to a heat exchanger for heating the intake air/fuel mixture. The device includes a housing having ceramic valve which is rotatable in the housing and which has two parallel gas passages separated by a web-like wall. In a first rotational position of the valve, the flow of gases is directed from the manifold through both passages and directly out to the muffler. When the valve is in a second rotational position, the flow of gases is directed through one of the two passages and into the heat exchanger. From the heat exchanger, the flow is directed back through a return line into the second passage of the valve and thereafter to the muffler.

11 Claims, 4 Drawing Figures

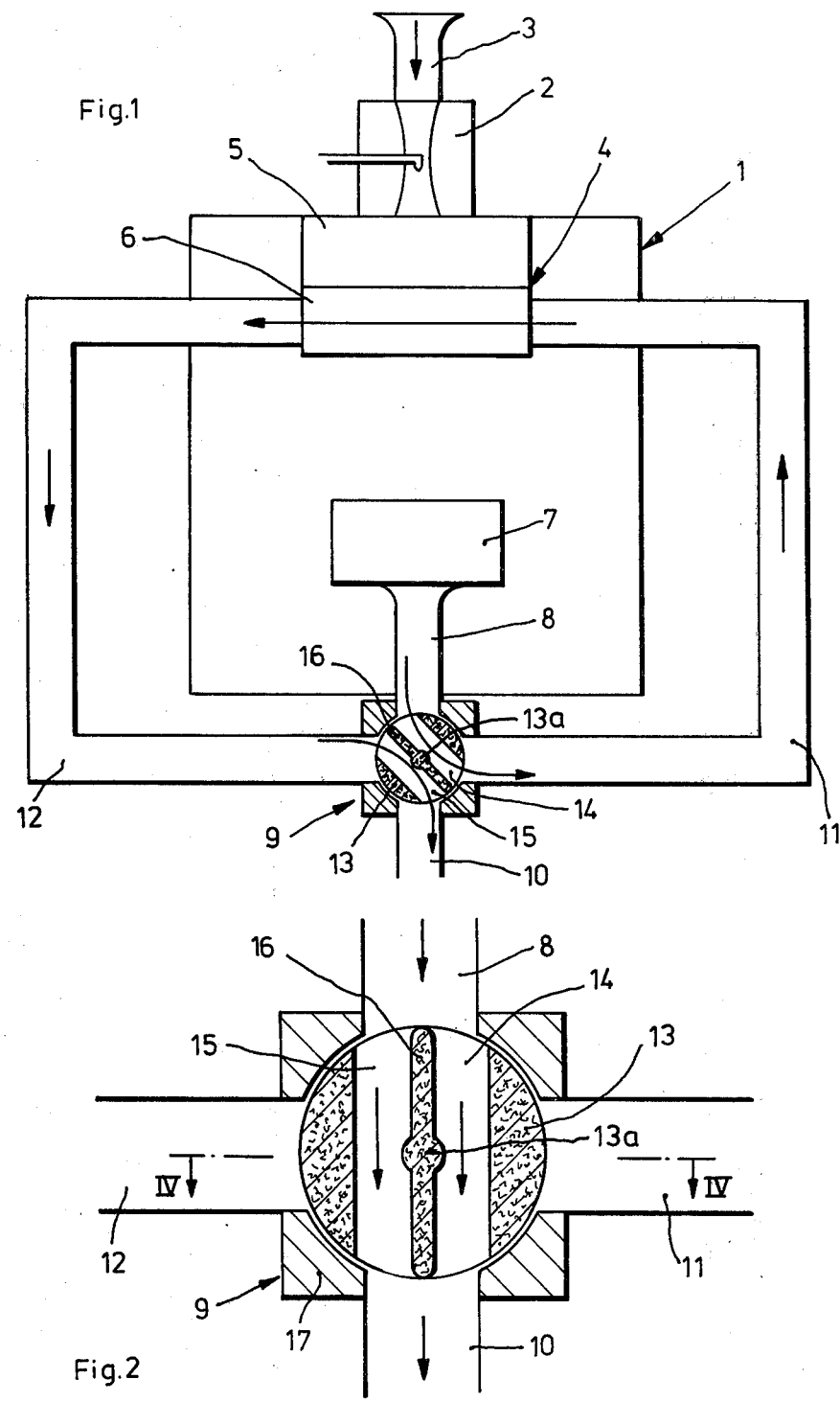

VALVED APPARATUS FOR DIVERTING AN EXHAUST STREAM

BACKGROUND OF THE INVENTION

The invention relates to a device for deflecting a flow of engine exhaust gas, according to the operating condition of the engine, either to one line leading to the atmosphere through the muffler, or to another line directing the flow back through a heat exchanger in the engine to preheat the intake air/fuel mixture, and then out through the muffler to the atmosphere.

In order to improve the performance of an internal combustion engine, especially when the engine is cold, the air/fuel mixture in the carburetor may be preheated by means of the exhaust gases leaving the engine. It is not, however, always desirable to preheat the intake mixture. For example, when operating the engine at full load condition, it is desirable to provide the engine with as much fuel as possible. Preheating, under this operating condition, results in expansion of the intake mixture, which results in less fuel being provided to the cylinder and subsequent power loss.

As a means to control the supply of hot exhaust gases to the heat exchanger, a deflecting flap may be arranged in the exhaust line and positioned to supply exhaust flow either to the heat exchanger, or to the muffler, depending upon the operating state of the engine. In such an arrangement, difficulties result because the exhaust, due to its high temperature, is corrosive, and it also carries a number of contaminants deriving from the combustion residue. Thus, in order to provide a deflecting flap which will be durable with extended engine use, the flap must be able to withstand these extreme operating conditions, and a refractory and costly material must be used.

SUMMARY OF THE INVENTION

In accordance with this invention, a device is provided for deflecting a flow of exhaust gases as described above which avoids the disadvantages of the prior art devices and is able to withstand extreme temperature exposure and the corrosive effects of the exhaust gases, yet it is simple in structure and economical to manufacture.

More specifically a device according to this invention comprises a ceramic valve having two parallel gas passages separated from each other by a web-like wall, the valve being rotatably retained in a housing. The housing connects to the exhaust manifold of the engine, a first line connected to the exhaust muffler, a second line connected to a heat exchanger for preheating the intake air/fuel mixture and also a return line from the heat exchanger back to the housing. In a first rotational position of the valve, the flow of exhaust gases from the manifold is directed through both passages in the valve member out through the first line to the muffler. When rotated to a second rotational position, the flow of gases is directed through one of the two passages into the second line, leading to the heat exchanger. At the same time the other passage connects the return line with the first line leading to the muffler such that after passing through the heat exchanger the diverted flow of the exhaust gases is directed through the housing and out to the muffler.

Since the valve member is fabricated from a ceramic material, it is able to withstand temperature exposure to the hot exhaust gases and thus the problems arising with the use of metallic materials are avoided. The use of a ceramic material also permits the ajoining gas passages to be formed comparatively close together, separated from each other by only a narrow web. Due to the relative proximity of the two passages, a comparatively small angle of rotation suffices to switch the valve from its first rotational position to the second.

Additional features and advantages of the invention will be illustrated and described further below by way of the following description of a preferred embodiment of the invention.

BRIEF DESCRIPTION OF THE DRAWINGS

For a better understanding of the invention, reference is made to the following drawings and detailed description of a preferred embodiment, in which:

FIG. 1 is a schematic diagram of an internal combustion engine having a deflection device according to the invention, shown in its second rotational position;

FIG. 2 is an enlarged cross-sectional view of a deflection device according to the invention, in its first rotational position;

DESCRIPTION OF THE PREFERRED EMBODIMENT

Figure 3:
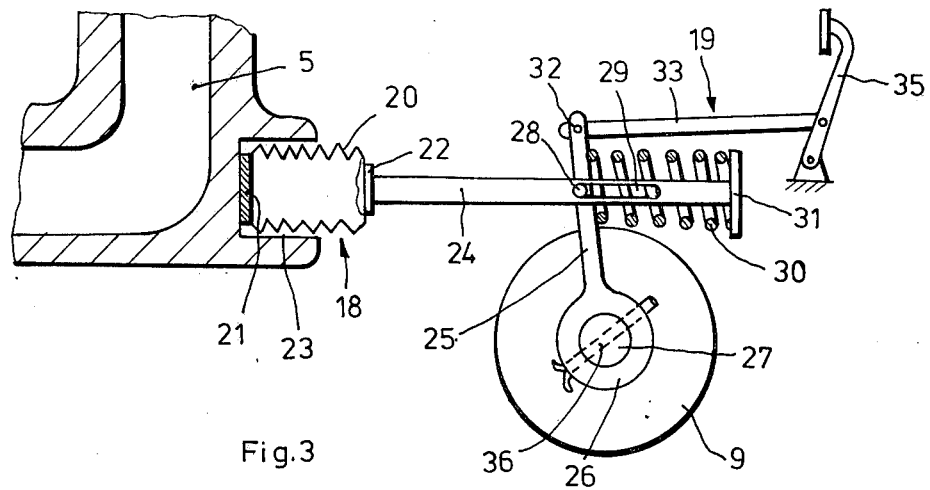
FIG. 3 is a schematic view of the control means controlling the deflection device responsive to temperature and to the detection of full load engine operation.

FIG. 1 schematically shows an internal combustion engine 1, for example a motor vehicle engine, having an air intake 3, which is connected to carburetor 2. The fuel/air mixture from carburetor 2 is fed by way of an intake passage 5 to the several cylinders of the engine for combustion, and the exhaust gases are then expelled from the cylinders through an exhaust connection to an exhaust manifold 8.

From the exhaust manifold 8, the flow of exhaust gases passes into a deflection mechanism 9, which connects the manifold 8 either to a first line 10 leading directly to the muffler, not here shown, or to a second line 11 leading to a heat exchanger 4, all of the connections lying substantially in a plane. The connections are disposed substantially uniformly around the outside of the housing 17 of the deflection mechanism 9, and the connections for the manifold 8 and the first line 10, and the connections for the second line 11 and the return line 12, are diametrically opposite from each other, respectively. In the heat exchanger 4, a system of conduits 6, through which the flow of exhaust gases passes, is in direct heat exchange with the intake duct 5 or parts thereof. From the heat exchanger 4, the flow of gases is directed through a return line 12 back to the deflection mechanism 9, and then directly to the muffler.

The deflection mechanism 9 comprises a cylindrical valve 13 mounted in a housing 17 and rotatable about an axis 13a substantially perpendicular to the plane in which the connections lie. The valve 13 has two parallel gas passages 14 and 15 separated by a web-like wall 16, and is formed of of a ceramic material in order to withstand severe thermal exposure to the hot exhaust. Such ceramic materials, for example aluminum oxide, silicon carbide or silicon nitride are known per se, the latter materials also especially useful as gas-carrying parts in gas turbines.

In its first rotational position, as shown in FIG. 2, both gas passages 14 and 15 connect the exhaust manifold 8, with the first line 10 leading to the muffler. In FIG. 1, in which the valve 13 has been rotated 45° to its second rotational position, one passage 14 connects the manifold 8 with the second line 11 leading to heat exchanger 4, and the other passage 15 connects the return line 12 coming from the heat exchanger 4 to the first line 10 leading to the muffler.

The deflection mechanism 9 may be controlled or regulated according to the operating condition of the engine, such that at low intake temperatures of the air/fuel mixture, when the engine is not under full load, the exhaust gases leaving the engine are utilized to preheat the fuel/air mixture passing through the intake passage 5. In this condition, then, the deflection mechanism 9 is rotated to its second rotational position, as indicated in FIG. 1. When the temperature of the intake air and/or of the fuel/air mixture is above a predetermined temperature limit, it is desirable that the valve 13 of deflection mechanism 9 be rotated to its first rotational position, as shown in FIG. 2, where the exhaust by-passes the heat exchanger 4 and is carried directly to the muffler and the atmosphere. It is further desirable that even at low air/fuel intake temperatures the deflection mechanism 9 be rotated to its first rotational position when the demand on the engine 1 is in the full load range, that is at full load or close to full load. This will prevent power loss to the engine caused by the decrease of fuel provided to the engine from preheating and expansion of the intake mixture. A thermostat mechanism 18, controlled by the temperature of the mixture in the intake line, may be provided to control the rotational position of the valve 13. It is preferred that a second mechanism 19 capable of being actuated by the gas pedal, for example, be provided to rotate the valve 13 to its first rotational position in the full load range, regardless of the intake temperature.

As shown in FIG. 3 the thermostat mechanism 18 is formed by a gas thermostat comprising an elastic bellows 20 filled with a gas and closed by end plates 21 and 22, respectively. The end plate 21 is fastened in a bore 23 at the intake line 5 so that the temperature of the fuel-air mixture flowing in the intake line 5 is transferred to the gas. So the volume of the gas and even the axial length of the bellows 20 is dependent upon the temperature of the air-fuel mixture in the intake line 5. If the temperature is low, for example at cold starting of the engine, the bellows 20 is contracted whilst at operating temperatures of the engine the bellows 20 is enlarged. Enlarging of the bellows 20 thrusts a rod 24 fastened to the end plate 22 to the right and turns an actuating lever 25 connected to the rod 24 by means of a pin 28 passing through a longitudinal slot 29 of the rod 24 in the clockwise direction. A hub 26 of the actuating lever 25 is fastened on a shaft 27 of the valve 13 by means of a split pin 36 so that turning of the actuating lever 25 in the clockwise direction results in rotating the valve 13 from its second to its first rotational position.

In order to rotate the valve 13 to its first rotational position in the full load range of the engine regardless of the intake temperature, the end 32 of the actuating lever 25 is linked to a rod 33 connected to the gas pedal 35. So pressing down the gas pedal 35 to reach the full load range of the engine results in turning the actuating lever 25 in the clockwise direction even when the bellows 20 is contracted because of a cold air-fuel mixture in the intake line 5. Thereby the pin 28 slides in the longitudinal slot 29 of the rod 24 and the spring 30 is compressed between the the actuating lever 25 and a washer 31 attached at the end of the rod 24.

Alternatively, however, the deflection mechanism 9 may be controlled or regulated according to the temperature of the exhaust, the setting of the throttle, the suction in the intake duct, or simply the lapse of time. Thus, a switching operation is executed whenever a certain preassigned limiting value of the control variable is exceeded. The mechanisms used might, for example, be wax or gas thermostats, bimetallic elements, electric motor or electromagnetic as well as servo suction mechanisms.

The fact that the valve of the deflection mechanism 9 is made of a ceramic material enables the deflection mechanism to be placed directly in the exhaust flow and comparatively close to the engine without difficulty. The use of a ceramic material also permits the arrangement of the two passages 14 and 15 comparatively close together, separated from each other by a comparatively narrow web-like wall 16. If a metallic material were used, such a thin wall would never withstand the high thermal stresses. Furthermore, this design makes it possible for a comparatively small angle of rotation, that is, about 45°, to rotate the valve 13 from its first to its second rotational position. However, any desired intermediate position may also be obtained, for instance, while the engine is only partially warmed-up, which will divert only a portion of the hot exhaust gases through the heat exchange.

In the deflection mechanism hereinbefore described, the valve 13 need not be fitted very closely within the housing 17, since minor leakage will not substantially impair the performance of the engine.

Another advantage of the deflection mechanism according to the invention is that, owing to the basic design, a pressure equalization is automatically established in the system in a deflected setting, so that the actuating forces required to maintain the valve 13 in position are comparatively small. Also, in the first position shown in FIG. 2, practically the entire port area is available at the valve, so that there will be no exhaust back-up and the power sacrifice will be comparatively small.

It is also desirable that the pivots of the valve 13 and the bearings accommodating the pivots in the housing consist of a temperature- and corrosion-resistant material, for example, ceramic.

Figure 4:
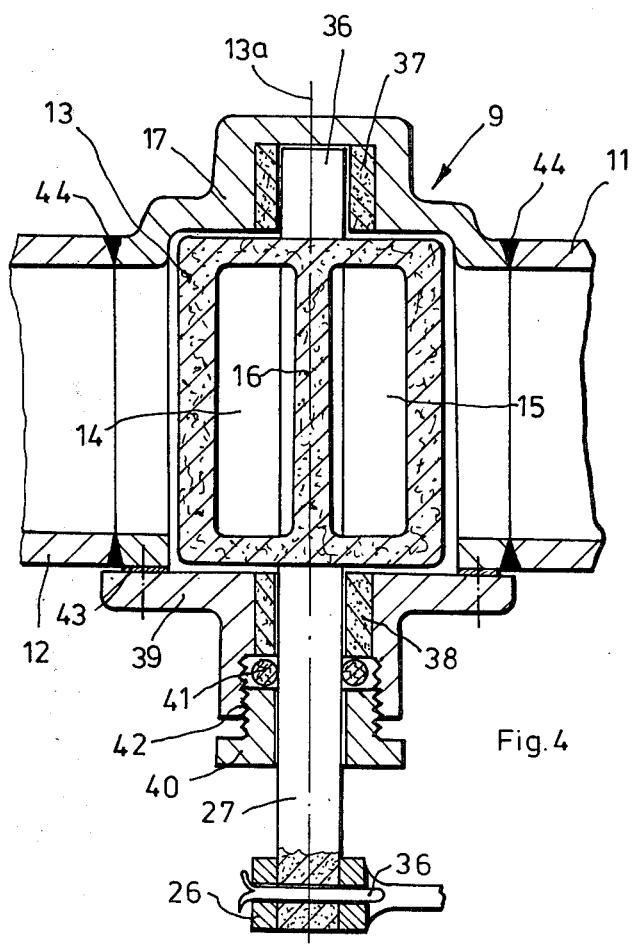
FIG. 4 is a longitudinal section view of the deflection device taken along the sectional lines IV—IV in FIG. 2.

As shown in FIG. 4 the pivot 36 and the shaft 27 of the valve 13 are supported in bearing sleeves 37 and 38, respectively, formed of ceramic. The housing 17 of the deflection device 9 is closed at the pivot end of the valve 13, whereas at the other end there is fixed a bearing cover 39 to the open front end of the housing interposing a high temperature resistant gasket 43.

The bearing 38 in the bearing cover 39 is sealed by means of a sealing ring 41 formed of a temperature resistant material, for example asbestos, which is compressed by a thrust sleeve 40 threaded into a thread 42 of the bearing cover 39.

The form of the invention described herein is illustrative and in no way intended to restrict the scope of the claims. Various modifications will be apparent to those skilled in the art, and all such modifications and variations are meant to be within the scope of the invention, as defined in the following claims.

We claim:

1. In an internal combustion engine a device for directing the flow of exhaust gases of said internal combustion engine from the exhaust manifold of the engine either through a first line passing the flow to the exhaust muffler, or through a second line passing the flow to a heat exchanger for preheating the intake air/fuel mixture, and thereafter to a return line for returning the flow of gases from the heat exchanger to the muffler, depending upon the operating conditions of the engine, said device comprising a housing including means for connecting said manifold, said first line, said second line, and said return line to said housing, a ceramic valve member rotatable about an axis and retained in said housing and having two parallel gas passages separated by a web-like wall, wherein in a first rotational position of said valve member both of said passages connect said manifold to said first line, and in a second rotational position of said valve member one of said passages connects said manifold to said second line, and the other of said passages connects said return line to said first line.

2. A device according to claim 1 wherein said housing has four connections, each lying substantially in a plane perpendicular to the axis of rotation of said valve member, said connections being adapted for receiving said exhaust manifold, said first line, said second line, and said return line.

3. A device according to claim 2 wherein said connections are disposed substantially uniformly around the outside of said housing and wherein the connections for said manifold and said first line, and the connection for said second line and said return line, are diametrically opposite from each other, respectively.

4. A device according to claim 1 or 2 or 3 wherein said first rotational position and said second rotational position of said valve member are substantially 45° of rotation apart.

5. A device according to claim 4 further comprising means responsive to the operating condition of the engine for controlling the position of said valve member.

6. A device according to claim 5 wherein said means for controlling said valve member comprises means responsive to the temperature of the intake air/fuel mixture.

7. A device according to claim 6 wherein said control means is a thermostat mechanism.

8. A device according to claim 6 wherein said control means includes means for positioning said valve member at its said second position when the said temperature is below a predetermined limit, and for positioning said valve member at said first position when said temperature is above said limit, and further comprises means for rotating said valve member to said first position when the output of the engine is in the full load range.

9. A device according to claim 8 wherein said control means comprises a thermostat mechanism, and wherein said means for rotating said valve in response to the detection of the full load range of the engine comprises a second mechanism superimposed on said thermostat mechanism.

10. A device according to claim 4 wherein said valve member is rotatably retained within said housing by bearings formed of temperature and corrosion-resistant material.

11. A device according to claim 10 wherein said material is ceramic.

* * * * *